United States Patent [19]
Hamada et al.

[11] Patent Number: 5,314,762
[45] Date of Patent: May 24, 1994

[54] PORTABLE POWER SOURCE

[75] Inventors: Akira Hamada; Nobuyoshi Nishizawa; Hiroshi Mukai; Isao Furukawa; Takashi Oda; Akira Watanabe; Takaaki Matsubayashi, all of Osaka, Japan

[73] Assignee: Sanyo Electric Co., Ltd., Osaka, Japan

[21] Appl. No.: 906,362

[22] Filed: Jun. 30, 1992

[30] Foreign Application Priority Data

May 12, 1992 [JP] Japan ................................. 4-119030

[51] Int. Cl.$^5$ ........................ H01M 8/02; H01M 8/22
[52] U.S. Cl. .......................................... 429/37; 429/36; 429/58; 429/59
[58] Field of Search ........................ 489/19, 36, 37, 58, 489/59; H01M 8/02, 8/22

[56] References Cited
U.S. PATENT DOCUMENTS 3,664,873 5/1972 Buswell et al. .................... 429/625

OTHER PUBLICATIONS

"High-Tech Hydrides on the Way", Chemical Week, Feb. 26, 1986.
"Hydride Hydrogen Powers Compact Fuel Cell," Design News, Dec. 5, 1988.
"Fuel Cell Portable Power", Ergenics Power Systems, Inc. (catalog).

Primary Examiner—Kathryn Gorgos
Attorney, Agent, or Firm—Wegner, Cantor, Mueller & Player

[57] ABSTRACT

The present invention provides a portable power source comprising a fuel cell generating electricity using hydrogen as fuel, a hydrogen storage unit filled with hydrogen absorbing alloy for supplying hydrogen to the fuel cell, a case enclosing the fuel cell and hydrogen storage unit, and a lid for sealing a part of the case when the portable power source is not in use, wherein the lid seals a surface of the case on which at least one air inlet for taking in the air necessary for the fuel cell to generate electricity and a reactant gas outlet for exhausting reactant gas produced by the generation of electricity are formed.

19 Claims, 4 Drawing Sheets

PORTABLE POWER SOURCE

BACKGROUND OF THE INVENTION (1) Field of the Invention

The present invention relates to a portable power source, particularly, to a portable power source using a fuel cell.

(2) Description of Related Art

Since phosphoric acid fuel cells (PAFC), molten carbonate fuel cells (MCFC), and solid oxide fuel cells (SOFC) convert chemical energy of supplied gas into electric energy, they retain superior efficiency in the generation of electricity. The fuel cells with capacity of 100 W to 100 kW are already in practical use, and particularly, the compact fuel cells are used as a power source for apparatus in outside transmissions, the civil engineering and construction, or the like.

Conventional power sources using compact fuel cells have a number of air inlets and a number of reactant gas outlets on the several surfaces of the cases enclosing the fuel cells, from which the air leaks into the cases when the power sources are not in use. Then electrolyte of the fuel cells(for instance, phosphoric acid) absorbs water in the air, deteriorating its concentration and therefore, cell characteristics. Accordingly, valves are formed at the inlets and outlets in order to shut off the air, even though satisfactory results are not obtained. In addition, forming the valves makes the construction of the power sources more complicated as well as adding weight thereto, which makes them unfavorable for portable ones.

SUMMARY OF THE INVENTION

The present invention has an object to provide a light-weight portable power source with simple construction and capable of preventing the air leakage thereinto.

The object is fulfilled by a portable power source which comprises a fuel cell generating electricity using hydrogen as fuel, a hydrogen storage unit filled with hydrogen absorbing alloy for supplying hydrogen to the fuel cell, a case enclosing the fuel cell and hydrogen storage unit, a lid for sealing a part of the case when the portable power source is not in use, wherein the lid seals a surface of the case on which at least one air inlet for taking in the air necessary for the fuel cell to generate electricity and a reactant gas outlet for exhausting reactant gas produced by the generation of electricity are formed.

Sealing the air inlet and reactant gas outlet formed on the case with the lid prevents the air leakage thereinto when the portable power source is not in use. Therefore, the electrolyte concentration as well as cell characteristics will not be deteriorated.

The portable power source further comprises an air inlet duct between the air inlet and the fuel cell, and an exhaust duct between the fuel cell and the reactant gas outlet, wherein a part of the internal surface of the case also serves as a part of the inlet duct and that of the exhaust duct.

The above construction can reduce parts for the inlet duct and exhaust duct, contributing to the lightening of the portable power source.

The hydrogen storage unit may be placed in the exhaust duct.

Although the temperature of the hydrogen storage unit falls in the course of the hydrogen supply, the above construction enables it to maintain an operatable temperature by being heated with the reactant heat carried by the reactant gas flowing through the exhaust duct.

The lid may seal a surface of the case on which a control panel for controlling the operation of the power source is placed.

With the above construction, misoperation can be prevented by covering the control panel with the lid.

The hydrogen storage unit may include cylinders filled with hydrogen absorbing alloy as well as a pan for collecting condensate running down from the surfaces thereof.

The temperature of the cylinders falls due to the hydrogen supply, during which water in the reactant gas condensates on the surfaces of the cylinders; however, the pan collects substantially all of the condensate, preventing the spill of the condensate inside the case, and therefore, preventing deterioration in electrolyte concentration as well as cell characteristics.

An absorber may be placed on the pan for absorbing the condensate running down from the surfaces thereof.

The absorption of the condensate by the absorber prevents the condensate from spilling inside the case even when the hydrogen storage unit is removed from the power source.

The hydrogen storage unit may include cylinders filled with hydrogen absorbing alloy as well as the absorber for absorbing the condensate running down from the surfaces thereof.

Forming the absorber on the hydrogen storage unit can prevent deterioration in electrolyte concentration and cell characteristics.

The case may include clamps for sealing the case with the lid, and a sealing member may be placed on the edge of the case where the lid fits therewith so as to encircle the edge, thereby further ensuring sealing effect.

BRIEF DESCRIPTION OF THE DRAWINGS

These and other objects, advantages and features of the invention will become apparent from the following description thereof taken in conjunction with the accompanying drawings which illustrates specific embodiments of the invention In the drawings.

DESCRIPTION OF THE PREFERRED EMBODIMENTS

Embodiment I

Figure 1:
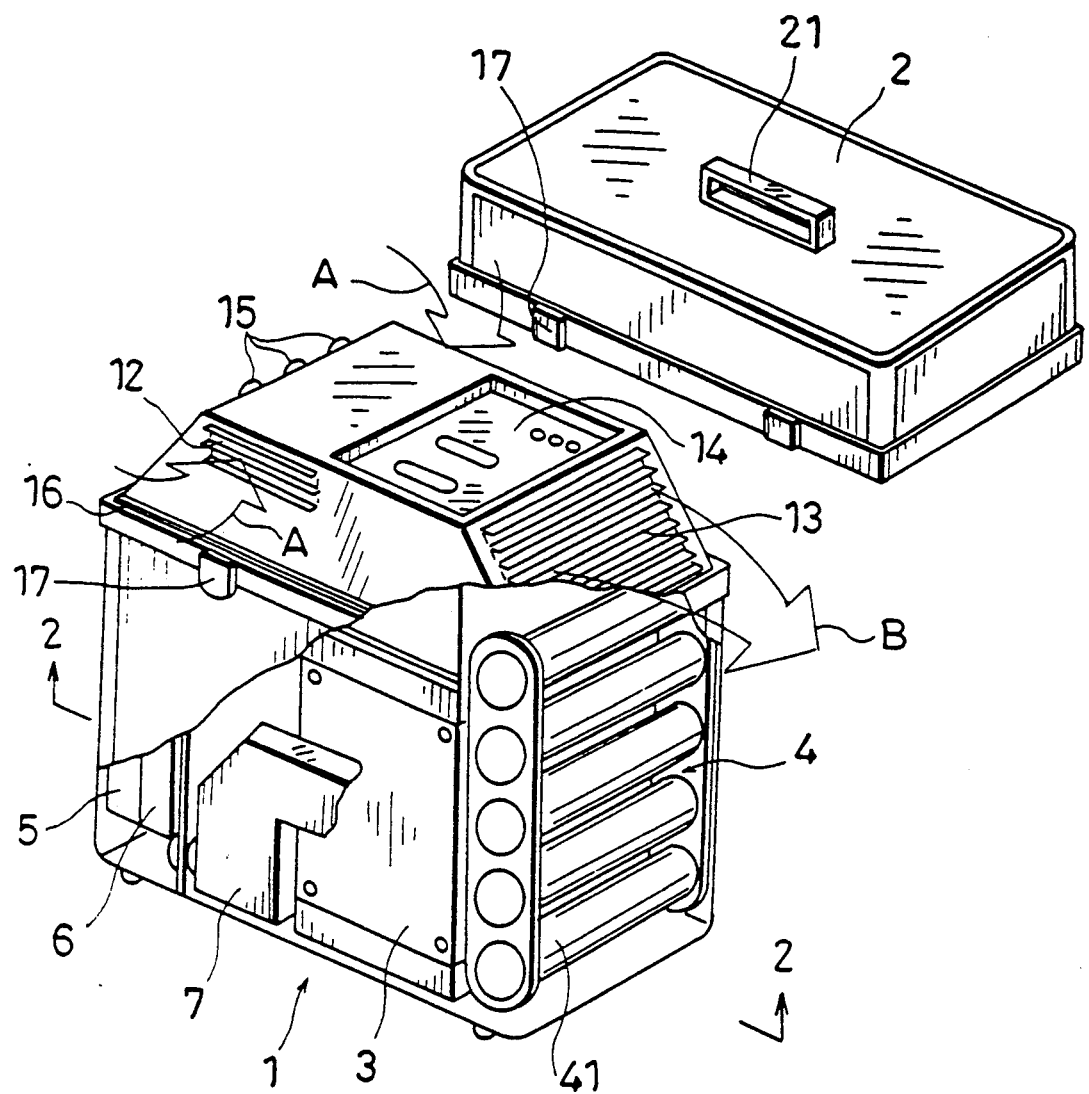
FIG. 1 is a cross section of the main part of a power source of the present invention.
Figure 2:
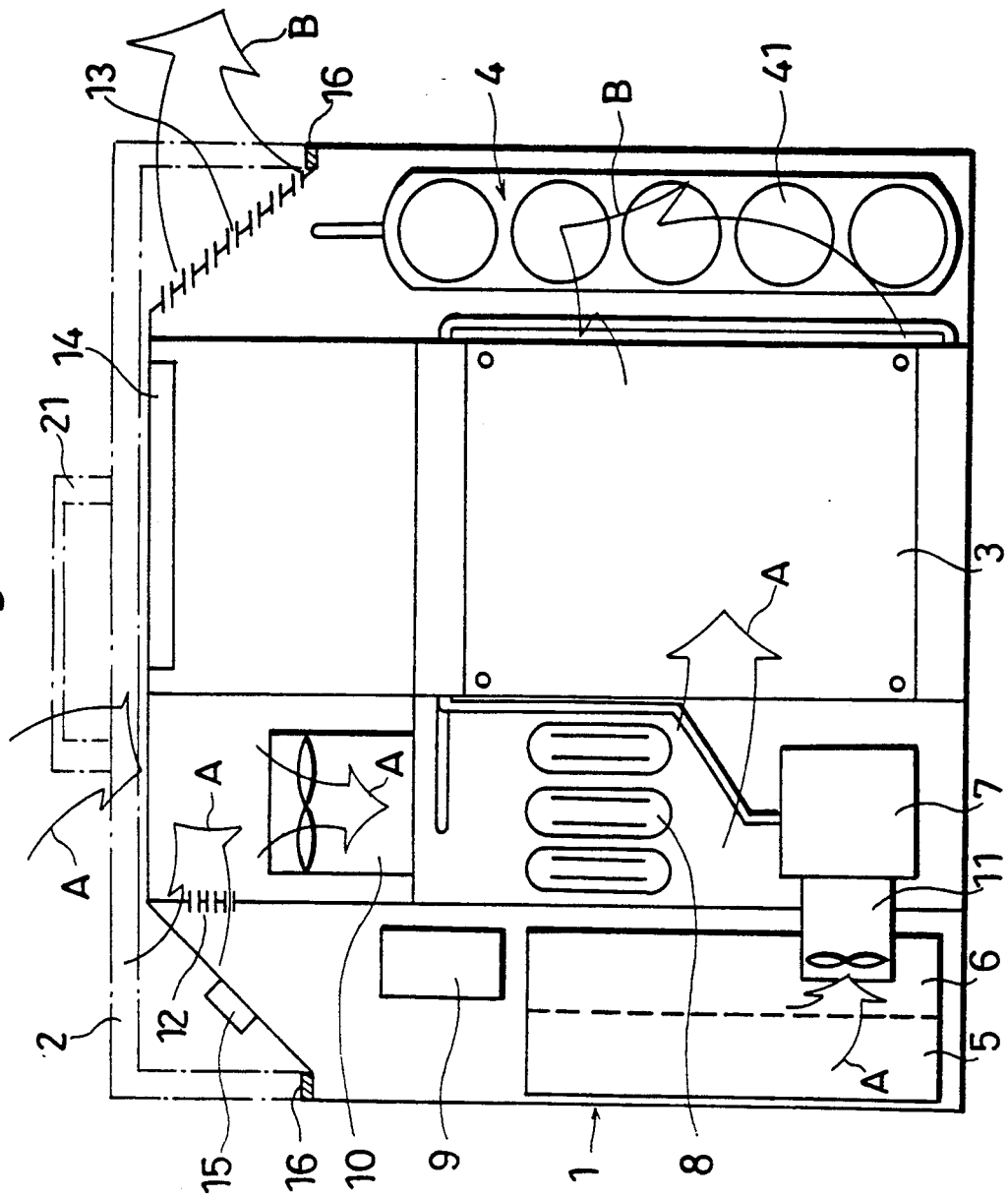
FIG. 2 is an X—X transverse cross section of FIG. 1.

As shown in FIGS. 1 and 2, the portable power source of the present invention comprises a case 1 and a lid 2 made from light metal such as aluminum or DURALUMIN (an aluminum alloy containing copper, magnesium, and magnanese in a ratio, respectively, of 95:4:0.5:0.5). The case 1 encloses a fuel cell 3 (for instance, a phosphoric acid fuel cell), a hydrogen storage unit 4 for supplying hydrogen to the fuel cell 3 during the operation, a control unit 5, a DC-DC converter 6 for maintaining constant electromotive force produced by the generation of electricity, a catalytic burner 7 filled with platinum catalyst, a start-up heater 8, a fuse relay box 9, and air supply fans 10 and 11. The hydrogen storage unit 4 includes a number of cylinders filled with hydrogen absorbing alloy. The start-up heater 8 and air supply fans 10 and 11 are driven on the electricity generated by the fuel cell 3. The start-up heater 8 heats up the fuel cell 3 to its operation temperature, approximately 100° C. The catalytic burner 7 consumes unreacted hydrogen released from the fuel cell 3 with the air from the air supply fan 11 by catalytic combustion so that no unreacted hydrogen will be released to the atmosphere. What controls the portable power source is the control unit 5, and for instance, it controls a rotating speed of the air supply fan 11 in order to adjust the air supply to the catalytic burner 7, or it controls the operation of the start-up heater 8 like making it stop heating up the fuel cell 3 at the operation temperature thereof.

Most of the air taken in from air inlets 12 with the operation of the air supply fan 10 flows directly into the fuel cell 3 for the generation of electricity, and the remains flow into the fuel cell 3 after having flown around the control unit 5, DC-DC converter 6, and the like so that they cool these devices. The high-temperature reactant gas carrying the heat of reaction produced in the fuel cell 3 is released to the atmosphere through a reactant gas outlet 13 while heating up the hydrogen storage unit 4 placed on the way. A part of the internal surface of the case 1 also serves as a part of an air inlet duct between the air inlet 12 and the fuel cell 3 and that of an exhaust duct between the fuel cell 3 and the reactant gas outlet 13, contributing to lightening of the portable power source.

Figure 3:
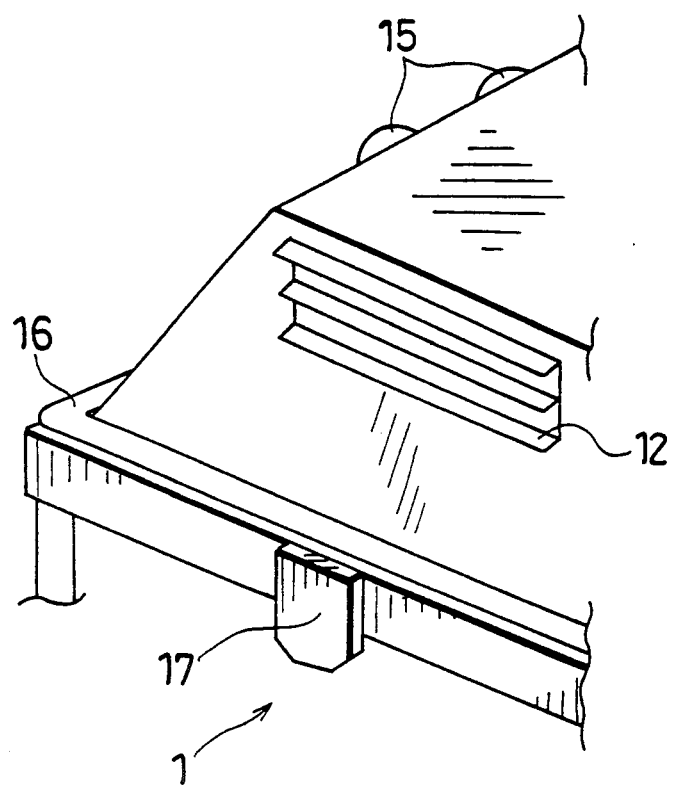
FIG. 3 is an enlargement showing a packing of the power source.

The upper part of the case is a truncated pyramid. The air inlet 12, another air inlet(not shown), reactant gas outlet 13, and connectors 15 are formed on each side surface thereof, respectively, wherein the side surface having the air inlet 12 and that having another air inlet oppose each other. A control panel 14 is placed on the top, which includes a lamp indicating a hydrogen remaining pressure, a switch for adjusting the hydrogen pressure, an switch for opening/shutting a valve when supplying hydrogen or the like(not shown). As shown in FIG. 3, a packing 16 is placed on the edge of the base of the truncated pyramid where the edge of the lid 2 fits so as to encircle the edge, in order to further ensure the sealing effect.

The case 1 and lid 2 are sealed together with clamps 17 in a way that the lid 2 covers the truncated pyramid, and with a handle formed on the top of the lid 2, the case, or the portable power source, can be easily carried to desired places.

The operation of the portable power source is described hereunder with referring to FIGS. 1 and 2, wherein an arrow A indicates the air flow and an arrow B indicates the reactant gas flow produced by the fuel cell 3 during the generation of electricity.

After the removal of the lid 2, the valve of the hydrogen storage unit 4 is opened by the switch on the control panel. Then with the remaining(unconsumed) air and hydrogen supplied from the hydrogen storage unit 4, the fuel cell 3 pre-generates electricity, which drives the air supply fan 10. With the operation of the air supply fan 10, the air is taken in from the air inlets 12 to the fuel cell 3, and the fuel cell 3 accordingly starts the generation of electricity. During the operation, the temperature of the fuel cell 3 rises by the heat of reaction from the generation, while that of the hydrogen storage unit 4 falls in the course of the hydrogen supply to the fuel cell 3. If the temperature of the latter continues to fall, it becomes incapable of supplying hydrogen, bringing deterioration in the generation. However, the high-temperature reactant gas transfers the heat of reaction it carries to the hydrogen storage unit 4 while flowing around thereof, thus enabling it to maintain the operatable temperature. On the other hand, although the control unit 5, DC-DC converter 6, and the like are gradually heated by the radiation from the fuel cell 3, the air from the air inlets 12 cools these devices while flowing around thereof.

As a result, smooth and sustainable generation of electricity is realized with the portable power source.

Although the air inlets 12, the reactant gas outlet 13 and the control panel 14 are formed on the upper surface of the case 1, they can be formed at any side surface thereof, provided that the lid 2 covers all of the aforementioned airtight.

The phosphoric acid fuel cell is used in the embodiment, however, one of the solid oxide fuel cells which is capable of operating at the lower temperature is also applicable.

Embodiment II

Figure 4:
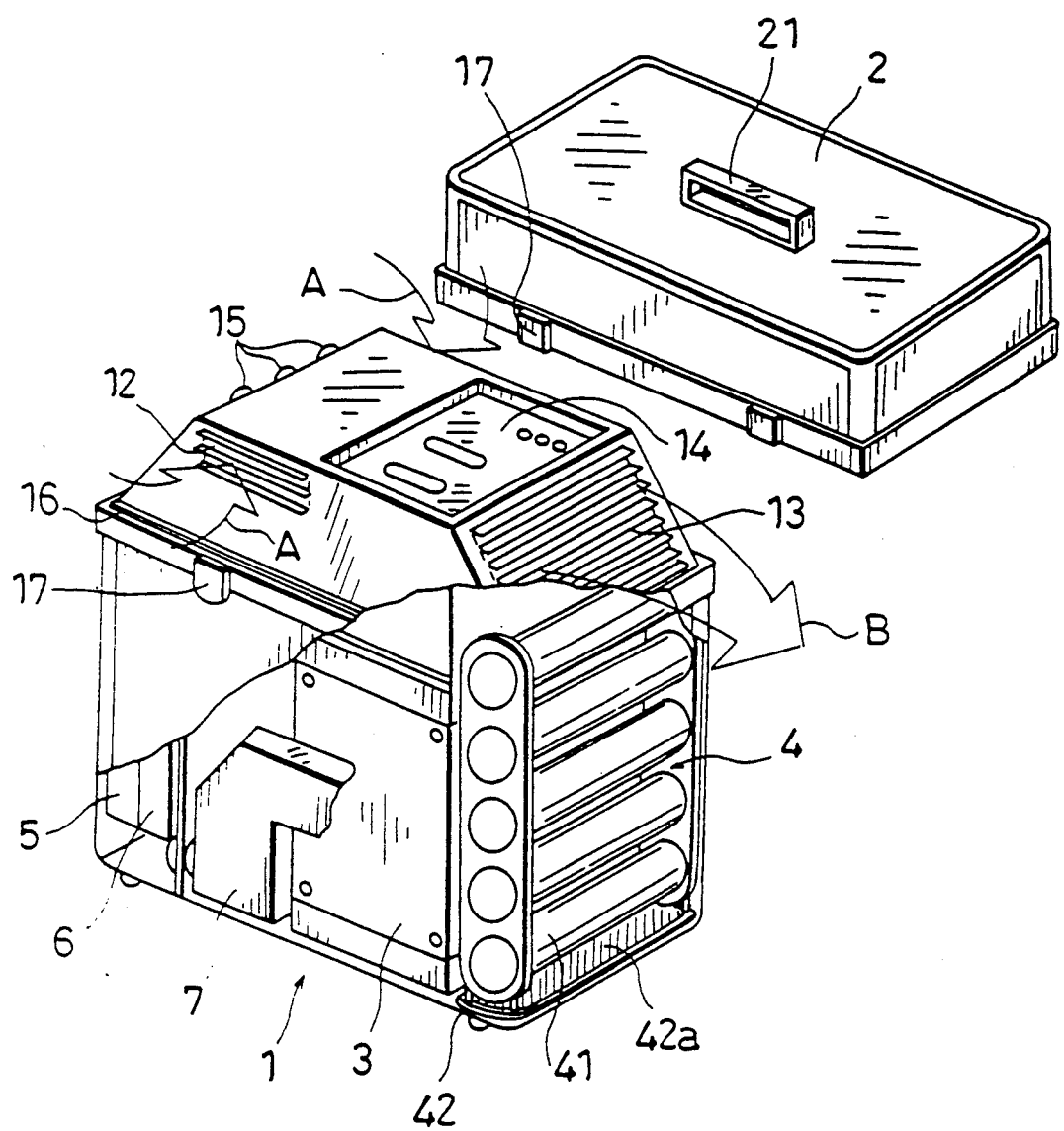
FIG. 4 is a cross section of the main part of another power source of the present invention.

As shown in FIG. 4, it has the same construction as Embodiment I except that the hydrogen storage unit 4 includes a pan 42. Hereinafter, like components are labeled with like reference numerals with respect to Embodiment I, and the description of these components is not repeated.

The hydrogen storage unit 4 having a number of cylinders 41 includes the pan 42 at the bottom, which includes an absorber 42a(for instance, Form 4S, a co-polymer of acrylic acid and sodium salt acrylate, Sumitomo Seika Chemicals Co., Ltd.).

As previously mentioned, the temperature of the hydrogen storage unit 4 falls in the course of the hydrogen supply, and the high-temperature reactant gas from the fuel cell 3 helps it to maintain its operatable temperature, during which the water in the reactant gas condenses on the surfaces of the cylinders 41 when it touches them. However, substantially all of the condensate running down therefrom is collected into the pan 42, and further, absorbed into the absorber 42a, making it possible to prevent the electrolyte of the fuel cell 3 from absorbing the condensate, therefore, deterioration in cell characteristics.

With the above construction, the condensate is removed easily by taking out the hydrogen storage unit 4 from the case 1 in stead of wiping off with a cloth or tissue papers. Moreover the absorption by the absorber 42a prevents the condensate from spilling inside the case 1 even when the portable power source is placed on a tilt. When the absorber 42a has come to its full capacity; capacity can be easily restored by replacing it with a new absorber.

Adding the pan 42 and absorber 42a to the portable power source does not affect its portability. Table 1 shows an operation condition of the portable power source, under which 3 g/min of high-temperature vapor is produced, meaning that less than 3 g/min, or less than 180 g/hr condensate is produced. Since the capacity of the absorber 42a is 200 to 600 g/g, only 1 g of the absorber 42a with the volume of 1.05–1.33 ml/g (bulk density of 0.75–0.95 g/ml) is enough for one hour operation of the portable power source.

TABLE 1

| DC output capacity (Wh) | 250(250W × 1 hour) |
| --- | --- |
| Output voltage (V) | 12 |
| Output current (A) | 21 |

It should be noted that the above construction enables the portable power source to maintain the portability as well as a constant electrolyte concentration by preventing the condensate from spilling inside the case 1, therefore deterioration in cell characteristics.

Remarks

The absorber 42a are formed in the pan 42, however, it can be formed on the hydrogen storage unit 4.

As the absorber 42a, Form 10 SH-NF, Form EP, Form ET (copolymers of acryic acid and sodium salt acrylate, Sumitomo Seika Chemical Co., Ltd.) or the like are also applicable.

The absorber 42a is not a must, however, it is preferable to have it in order to enhance reliability in preventing the spill of the condensate inside the case 1.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A portable power source comprising:
   a fuel cell generating electricity using hydrogen as fuel;
   a hydrogen storage unit filled with hydrogen absorbing alloy for supplying hydrogen to the fuel cell;
   a case having an internal surface enclosing the fuel cell and hydrogen storage unit; and
   a lid for sealing a part of the case when the portable power source is not in use,
   wherein the lid seals a surface of the case on which at least one air inlet for taking in the air necessary for the fuel cell to generate electricity and a reactant gas outlet for exhausting reactant gas produced by the generation of electricity are formed.

2. A portable power source of claim 1 wherein part of the internal surface of the case forms part of an inlet duct between the fuel cell and an air inlet, and part of the internal surface forms part of an exhaust duct between the fuel cell and a reactant gas outlet.

3. A portable power source of claim 2, wherein the hydrogen storage unit is placed in the exhaust duct.

4. A portable power source of claim 3, wherein the lid seals a surface of the case on which a control panel for controlling the operation of the power source is placed.

5. A portable power source of claim 4, wherein the hydrogen storage unit includes cylinders filled with hydrogen absorbing alloy as well as a pan for collecting condensate running down from the surfaces thereof.

6. A portable power source of claim 5, wherein an absorber is placed on the pan for absorbing the condensate running down from the surfaces thereof.

7. A portable power source of claim 4, wherein the hydrogen storage unit includes cylinders filled with hydrogen absorbing alloy as well as the absorber for absorbing the condensate running down from the surfaces thereof.

8. A portable power source of claim 1, wherein the case includes clamps for sealing the case with the lid.

9. A portable power source of claim 8, wherein a sealing member is placed on the edge of the case where the lid fits therewith so as to encircle the edge.

10. A portable power source of claim 1 further comprising a catalytic burner for consuming unreacted hydrogen by combustion.

11. A portable power source comprising:
    a case having an internal surface and an upper part including an upper surface enclosing a fuel cell and a hydrogen storage unit, at least one air inlet and a reactant gas outlet formed on the upper surface, part of an air inlet duct between the air inlet and the fuel cell and part of an exhaust duct between the fuel cell and the reactant gas outlet are formed on the upper surface, and part of the air inlet duct and the exhaust duct are formed on the internal surface of the case; and
    a lid for sealing the upper part of the case including the upper surface on which the air inlet and reactant gas outlet are formed when the portable power source is not in use.

12. A portable power source of claim 11, wherein the hydrogen storage unit is placed in the exhaust duct.

13. A portable power source of claim 12, wherein the lid seals a surface of the case on which a control panel for controlling the operation of the power source is placed.

14. A portable power source of claim 13, wherein the hydrogen storage unit includes cylinders filled with hydrogen absorbing alloy as well as a pan for collecting condensate running down from the surfaces thereof.

15. A portable power source of claim 14, wherein an absorber is placed on the pan for absorbing the condensate running down from the surfaces thereof.

16. A portable power source of claim 15, wherein the hydrogen storage unit includes cylinders filled with hydrogen absorbing alloy as well as the absorber for absorbing the condensate running down from the surfaces thereof.

17. A portable power source of claim 11, wherein the case includes clamps for sealing the case with the lid.

18. A portable power source of claim 17, wherein a sealing member is placed on the edge of the case where the lid fits therewith so as to encircle the edge.

19. A portable power source of claim 11, wherein a handle is formed on the lid for a carrying purpose.

* * * * *